Nov. 2, 1965 E. A. SCHILLING 3,215,910
SPIRAL WOUND CAPACITOR
Original Filed July 14, 1960
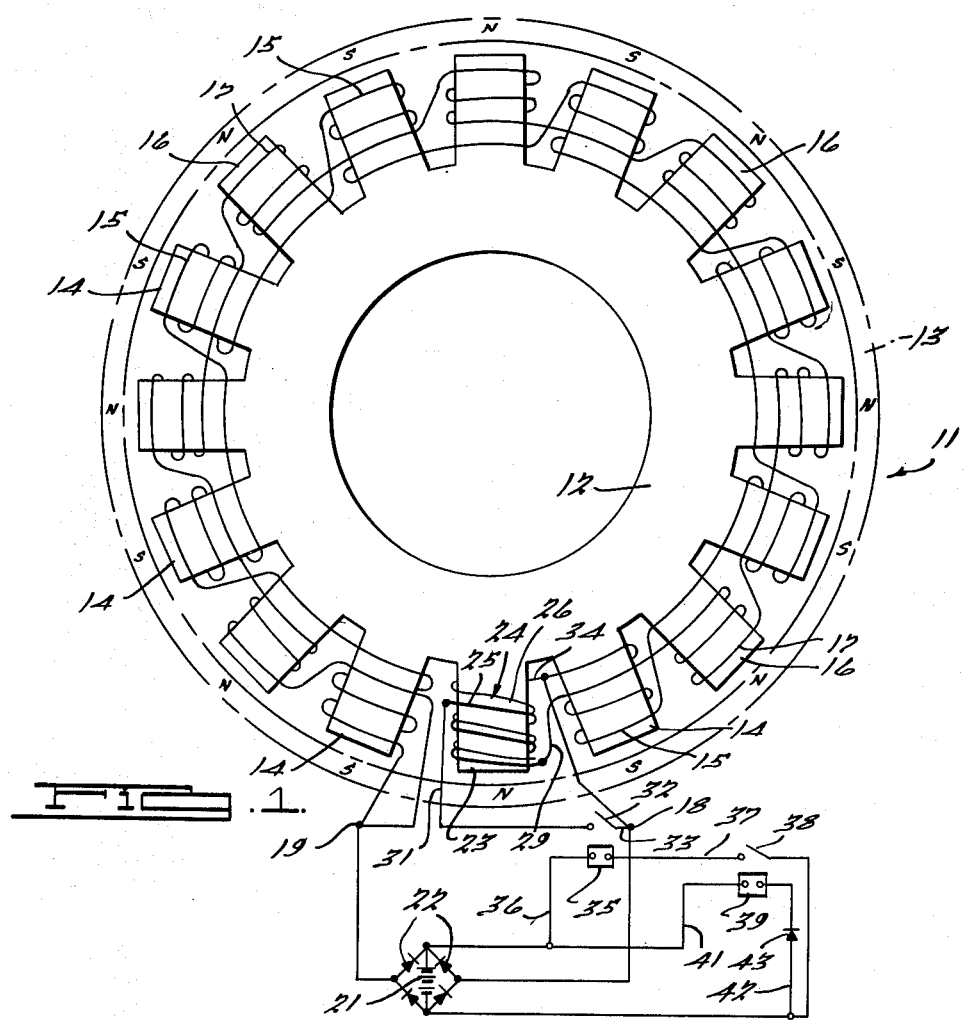
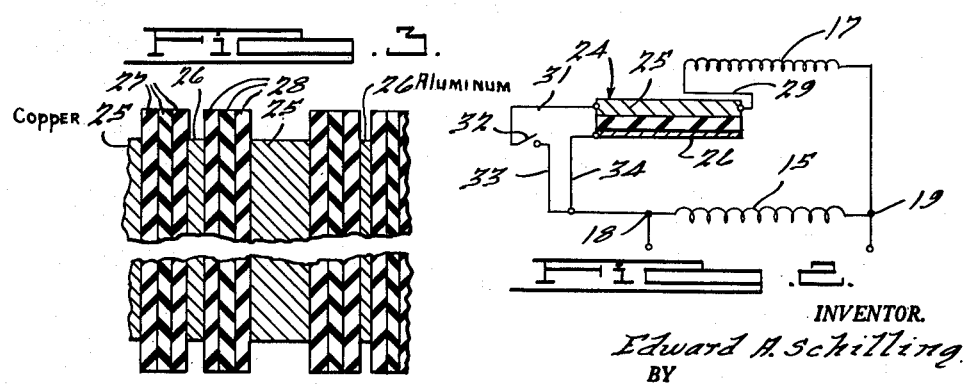
INVENTOR.
Edward A. Schilling
BY
Harness, Dickey & Pierce
ATTORNEYS

United States Patent Office 3,215,910
Patented Nov. 2, 1965

3,215,910
SPIRAL WOUND CAPACITOR
Edward A. Schilling, Drayton Plains, Mich., assignor to Syncro Corporation, Oxford, Mich., a corporation of Michigan
Original application July 14, 1960, Ser. No. 42,936, now Patent No. 3,092,767, dated June 4, 1963. Divided and this application Sept. 7, 1962, Ser. No. 226,763
1 Claim. (Cl. 317—260)

This application is a division of application Serial No. 42,936 filed July 14, 1960, now Patent No. 3,092,767, dated June 4, 1963.

This invention relates to inductance-capacitance devices for permanent magnet-type generators, and more particularly to means for regulating the output of such generators.

It is an object of the invention to provide a novel and improved inductance-capacitance device for use in conjunction with a permanent magnet generator of the type described and claimed in copending application Serial No. 830,432, filed July 29, 1959, now Patent No. 3,092,767, by Thomas F. Carmichael and assigned to the assignee of the present application.

It is another object to provide an improved inductance-capacitance device of this type which utilizes one of the windings of the capacitor itself as an inductance device, so that the capacitor assembly serves the dual function of providing capacitance in the resonant network and of aiding the other tank coils to reduce output when the capacitance is taken out of the circuit.

Other objects, features, and advantages of the present invention will become apparent from the subsequent description, taken in conjunction with the accompanying drawings.

In the drawings:

FIGURE 1 is a schematic electrical circuit diagram showing a typical installation using the novel regulator arrangement for charging a battery.

FIGURE 2 is a simplified electrical circuit diagram of the load and tank coils, the inductance-capacitance device, and the regulating switch; and FIGURE 3 is a fragmentary cross-sectional view of a portion of a combined inductance-capacitance coil made in accordance with the invention.

In general terms, the invention comprises an inductance-capacitance device for a permanent magnet generator having a plurality of voltage-generating coils, referred to as load coils, adapted to be connected across a load, and a second group of coils, referred to as tank coils, on alternate poles of the core and likewise connected across the load. An inductance-capacitance device is mounted on one of the poles in place of a tank coil and comprises a pair of metallic strips wound in overlapping spiral relation and separated by strips of dielectric material. One of the metallic strips is relatively thick and is of copper or other highly electrically conductive material, while the other strip is a thin strip of aluminum or metal having similar properties. One end of the copper strip is connected to an end of the tank coil series, and the second end to one contact of a regulator switch, the other contact of the switch being connected to an output terminal. The aluminum strip has one end (adjacent the second end of the copper strip) connected to the same output terminal and the other end unconnected.

With the switch open, the copper and aluminium strips will coact in a capacitative manner to impart properties to the circuit enhancing the output of the generator as described in the aforementioned application. When the switch is closed in response to a signal, such as the accumulation of a predetermined charge in a battery, the capacitance will be eliminated and the tank and load coils connected in electrical opposition to substantially reduce or eliminate the generator output, the copper strip carrying the tank coil current and coacting with the other tank coil winding to achieve this effect.

Referring more particularly to the drawings, the generator is generally indicated at 11 and comprises a core structure 12 and a relatively rotatable field structure 13, these structures being shown schematically in such fashion that the field structure surrounds the core structure. The core is shown as having sixteen poles, one set of poles 14 having load coils 15 thereon, whereas an alternate set of poles 16 have tank coils 17 thereon. The tank coils form part of an inductive-capacitative resonant network of the type described in the aforementioned copending application. Load coils 15 are shown as being connected in series across a pair of output terminals 18 and 19. A load comprising a battery 21 to be charged is connected across the output terminals through rectifiers 22.

Tank coils 17 are mounted on seven poles 16 between poles 14, and the eighth pole 23 carries an inductive-capacitative unit generally indicated at 24. This unit comprises a pair of metallic strips or foils 25 and 26, strip 25 being of copper or other highly electrically conductive metal, whereas strip 26 is fabricated of aluminum or a metal having similar electrical and mechanical properties.

Unit 24 may be manufactured by any of various known methods, including essentially the steps of winding the two strips in spiral fashion separated by two sets of dielectric separators 27 and 28, as shown in FIGURE 3. These separators may be of paper or other suitable dielectric material, the thickness and configuration of these separators being chosen in accordance with the desired electrical properties of the unit.

The cross-sectional area of copper strip 25 is such as to enable it to carry substantially the current flowing through tank coils 17. Aluminum strip 26 on the other hand is preferably made as thin as possible in order to conserve space and obtain the greatest number of turns of the foils in the winding that is possible in the space permitted, if desired to achieve the desired capacitance and inductance. FIGURE 3 shows the thickness difference between the copper and aluminum strips in exaggerated form.

The strips and separators are so wound as to be capable of being mounted on pole 23. One end of copper strip 25 (indicated as a heavy line in FIGURE 1) is connected by a lead 29 to one end of the tank windings 17, which in turn are connected in series. The orientation of strip 25 on its pole is such that it will be in aiding relation with respect to the tank coils. The other end of the copper strip is connected by a lead 31 to one contact of a switch 32, the other contact of this switch being connected by a lead 33 to output terminal 18.

Aluminum strip 26 has one free end, and the other end connected by a lead 34 to output terminal 18. The end of strip 26 connected to output terminal 18 is adjacent the end of strip 25 connected to switch 32.

Switch 32 is a regulating switch controlled by a relay 35. The illustrated embodiment of the regulating circuit bears some resemblance to that shown in Jacob Patent No. 2,900,591, dated August 18, 1959. One side of relay 35 is connected by a lead 36 to one side of battery 21, the other side of relay 35 being connected by a lead 37 to the other side of the battery. A sensing switch 38 is interposed in lead 37, this switch being normally open and being controlled by a sensing relay 39. The sensing relay is likewise connected across the battery by leads 41 and 42, lead 42 having a sensing device such as a zener diode 43 therein, this sensing device being responsive to the accumulation of a predetermined voltage in battery 21 to permit current flow in one direction through relay 39 but not permitting current flow in the other direction.

In operation, relative rotation of members 12 and 13 will cause the creation of electrical potentials in coils 15 and 17, and with switch 32 normally opened, unit 24 will act as a capacitor in series with tank coil 17. The coaction of voltage generating coils 15 with the resonant network comprising tank coils 17 and unit 24 will result in a substantial output at the terminals 18 and 19, charging battery 21.

When the battery reaches a predetermined voltage, device 43 will be triggered, energizing sensing relay 39 which will close switch 38. This will cause energization of regulating relay 35, closing switch 32. Although in appropriate circumstances switch 32 may be opened and closed very rapidly in a vibrating manner, the action of the circuit while switch 32 is closed may be considered as demonstrating the functions and advantages of the invention.

When switch 32 is closed, tank coils 17 and copper strip 25 will be connected in series across terminals 18 and 19. As described previously, the winding orientation of tank coils 17 and copper strip 25 is such that these coils and strip will be in opposition to the voltage created by load coils 15. This fact, plus the location of the tank coils or strip 25 on all poles between poles 14, will result in an extremely sharp reduction in the output at terminals 18 and 19. Upon opening of switch 32, strips 25 and 26 will again cooperate to produce the capacitative effect in the resonant network which includes tank coils 17, thus again enhancing the output of load coils 15 in accordance with the principles set forth in the aforementioned copending application.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

As an article of manufacture, an inductance-capacitance unit comprising a first foil strip of copper having a predetermined thickness and width, and a second foil strip of aluminum having substantially the same width but a thickness substantially less than that of said first foil strip, said strips being wound in overlapping spiral relation with dielectric separating means therebetween, said dielectric separating means comprising a first dielectric separator between said strips and a second dielectric separator outside the outer strip, the width of said dielectric separators being at least equal to the width of said foil strips whereby adjacent turns of said strips including the edges thereof are physically and electrically separated, the coefficient of electrical conductivity and the cross-sectional area of said first strip being sufficient to enable it to act as an inductive coil when carrying electrical current.

References Cited by the Examiner

UNITED STATES PATENTS

| 2,000,441 | 5/35 | Given | 317—256 |
| 2,552,306 | 5/51 | Beverly | 317—260 |
| 2,593,829 | 4/52 | Ardleter | 317—260 |
| 2,634,315 | 4/53 | Allison | 317—260 |
| 2,703,857 | 3/55 | Engelhardt | 317—261 |
| 2,785,351 | 3/57 | Allison | 317—260 |

FOREIGN PATENTS 649,398  1/51  Great Britain.

JOHN F. BURNS, *Primary Examiner.*

UNITED STATES PATENT OFFICE
CERTIFICATE OF CORRECTION

Patent No. 3,215,910　　　　　　　　　　　　　　November 2, 1965

Edward A. Schilling

It is hereby certified that error appears in the above numbered patent requiring correction and that the said Letters Patent should read as corrected below.

Column 1, line 21, for "3,092,767" read -- 3,009,092 --.

Signed and sealed this 6th day of September 1966.

SEAL)
Attest:

ERNEST W. SWIDER　　　　　　　　　　　　　　EDWARD J. BRENNER
Attesting Officer　　　　　　　　　　　　　　Commissioner of Patents